(12) United States Patent
Liu et al.

(10) Patent No.: US 11,215,755 B2
(45) Date of Patent: Jan. 4, 2022

(54) LOW LOSS, POLARIZATION-INDEPENDENT, LARGE BANDWIDTH MODE CONVERTER FOR EDGE COUPLING

(71) Applicant: GenXComm, Inc., Austin, TX (US)

(72) Inventors: Ke Liu, Austin, TX (US); Thien-An Nguyen, Austin, TX (US)

(73) Assignee: GenXComm, Inc., Austin, TX (US)

( * ) Notice: Subject to any disclaimer, the term of this patent is extended or adjusted under 35 U.S.C. 154(b) by 0 days.

(21) Appl. No.: 16/576,169

(22) Filed: Sep. 19, 2019

(65) Prior Publication Data

US 2021/0088724 A1 Mar. 25, 2021

(51) Int. Cl.
*G02B 6/122* (2006.01)
*G02B 6/14* (2006.01)
(Continued)

(52) U.S. Cl.
CPC .......... *G02B 6/1228* (2013.01); *G02B 6/105* (2013.01); *G02B 6/14* (2013.01); *G02B 2006/12061* (2013.01); *G02B 2006/12147* (2013.01)

(58) Field of Classification Search
CPC ......... G02B 6/1225; G02B 6/14; G02B 6/105
See application file for complete search history.

(56) References Cited

U.S. PATENT DOCUMENTS

| | | |
|---|---|---|
| 4,608,569 A | 8/1986 | Dickey, Jr. et al. |
| 5,444,864 A | 8/1995 | Smith |

(Continued)

FOREIGN PATENT DOCUMENTS

| | | |
|---|---|---|
| CN | 101379718 | 3/2009 |
| CN | 104484852 | 4/2015 |

(Continued)

OTHER PUBLICATIONS

Chang et al., "Full-duplex spectrum sensing in cognitive radios using optical self-interference cancellation," 2015 9th International Conference on Sensing Technology (ICST), IEEE, pp. 341-344, Dec. 8, 2015.

(Continued)

*Primary Examiner* — Thomas A Hollweg
*Assistant Examiner* — Mary A El-Shammaa
(74) *Attorney, Agent, or Firm* — Brownstein Hyatt Farber Schreck, LLP

(57) ABSTRACT

A mode converter formed by parallel tapered waveguides on a SiN platform. The waveguides form a trident structure comprising a main waveguide with an inverse taper structure, and a pair of waveguides on each side of the main waveguide. Each adjacent waveguide has a taper structure but one that is opposed to that of the main waveguide, namely, a width that gradually increases along the direction of light propagation to a larger value at an end tip thereof. The end tips of the waveguides terminate along a common input/output facet of the converter. The adjacent waveguides help to shape the mode of the light propagating through the main waveguide, in so doing enabling the converter to exhibit high coupling efficiency and polarization independence in the full optical communication bands (i.e., from O to L-band) by successfully tuning the mode shape at a chip facet. The trident mode converter enables efficient optical fiber-to-chip coupling.

16 Claims, 9 Drawing Sheets

(51) Int. Cl.
  *G02B 6/10* (2006.01)
  *G02B 6/12* (2006.01)

(56) References Cited

U.S. PATENT DOCUMENTS

| | | | |
|---|---|---|---|
| 5,578,845 | A | 11/1996 | Yoshiyuki et al. |
| 5,699,176 | A | 12/1997 | Cohen |
| RE35,736 | E | 2/1998 | Powell |
| 5,757,312 | A | 5/1998 | Szmurlo |
| 5,867,293 | A | 2/1999 | Kotten |
| 5,904,546 | A | 5/1999 | Wood et al. |
| 6,359,714 | B1 | 3/2002 | Imajo |
| 6,373,909 | B2 | 4/2002 | Lindquist |
| 6,507,728 | B1 | 1/2003 | Watanabe |
| 6,539,204 | B1 | 3/2003 | Marsh |
| 6,567,648 | B1 | 5/2003 | Ahn |
| 6,567,649 | B2 | 5/2003 | Souissi |
| 6,745,018 | B1 | 6/2004 | Zehavi |
| 6,751,447 | B1 | 6/2004 | Jin |
| 6,760,454 | B1 | 7/2004 | Shreve |
| 6,771,931 | B2 | 8/2004 | Waltho |
| 6,778,319 | B2 | 8/2004 | Chavez-Pirson |
| 6,907,093 | B2 | 6/2005 | Blount |
| 7,020,396 | B2 | 3/2006 | Izadpanah |
| 7,058,368 | B2 | 6/2006 | Nicholls |
| 7,064,697 | B2 | 6/2006 | Taylor et al. |
| 7,085,497 | B2 | 8/2006 | Tiemann |
| 7,123,676 | B2 | 10/2006 | Gebara |
| 7,130,289 | B2 | 10/2006 | Kuan et al. |
| 7,355,993 | B2 | 4/2008 | Adkins |
| 7,366,244 | B2 | 4/2008 | Gebara |
| 7,446,601 | B2 | 11/2008 | LeChevalier |
| 7,496,257 | B2 | 2/2009 | Levner |
| 7,509,054 | B2 | 3/2009 | Calabro et al. |
| 7,566,634 | B2 | 7/2009 | Beyne et al. |
| 7,650,080 | B2 | 1/2010 | Yap |
| 7,660,531 | B2 | 2/2010 | Lee |
| 7,672,643 | B2 | 3/2010 | Loh |
| 7,680,368 | B2 | 3/2010 | Welch et al. |
| 7,711,329 | B2 | 5/2010 | Aparin |
| 7,720,029 | B2 | 5/2010 | Orava |
| 7,729,431 | B2 | 6/2010 | Gebara |
| 7,756,480 | B2 | 7/2010 | Loh |
| 7,809,047 | B2 | 10/2010 | Kummetz |
| 7,826,808 | B2 | 11/2010 | Faulkner |
| 7,853,195 | B2 | 12/2010 | Higgins |
| 7,869,527 | B2 | 1/2011 | Vetter |
| 7,876,867 | B2 | 1/2011 | Filipovic |
| 7,907,895 | B2 | 3/2011 | Shinagawa |
| 7,917,177 | B2 | 3/2011 | Bauman |
| 8,036,606 | B2 | 10/2011 | Kenington |
| 8,055,235 | B1 | 11/2011 | Gupta et al. |
| 8,078,130 | B2 | 12/2011 | Fudge |
| 8,081,946 | B2 | 12/2011 | Fudge |
| 8,155,605 | B2 | 4/2012 | Hwang |
| 8,170,487 | B2 | 5/2012 | Sahota et al. |
| 8,233,872 | B2 | 7/2012 | Nagai |
| 8,249,540 | B1 | 8/2012 | Gupta |
| 8,270,843 | B2 | 9/2012 | Nakamoto |
| 8,299,555 | B2 | 10/2012 | Su et al. |
| 8,320,504 | B2 | 11/2012 | Peng |
| 8,331,509 | B2 | 12/2012 | Wang |
| 8,351,874 | B2 | 1/2013 | Dent |
| 8,477,871 | B2 | 7/2013 | Neumann |
| 8,521,090 | B2 | 8/2013 | Kim |
| 8,526,903 | B2 | 9/2013 | Gudem |
| 8,565,681 | B2 | 10/2013 | Kim |
| 8,600,200 | B1 | 12/2013 | Rakich et al. |
| 8,618,966 | B2 | 12/2013 | Kanter |
| 8,682,170 | B2 | 3/2014 | Prucnal |
| 8,730,786 | B2 | 5/2014 | Wang |
| 8,781,030 | B2 | 7/2014 | Peng |
| 8,785,332 | B2 | 7/2014 | Johnson et al. |
| 8,805,298 | B2 | 8/2014 | McCallister |
| 8,845,854 | B2 | 9/2014 | Lei et al. |
| 8,867,928 | B2 | 10/2014 | Piehler |
| 8,872,583 | B2 | 10/2014 | Lee |
| 8,971,712 | B2 | 3/2015 | Fan et al. |
| 8,977,223 | B1 | 3/2015 | Gupta |
| 9,020,307 | B2 | 4/2015 | Ishikawa |
| 9,100,099 | B2 | 8/2015 | Loh |
| 9,106,453 | B2 | 8/2015 | Wang |
| 9,178,635 | B2 | 11/2015 | Ben-Shlomo |
| 9,184,902 | B2 | 11/2015 | Khojastepour |
| 9,195,052 | B2 | 11/2015 | Long |
| 9,214,718 | B2 | 12/2015 | Mow |
| 9,224,650 | B2 | 12/2015 | Lei et al. |
| 9,252,857 | B2 | 2/2016 | Negus |
| 9,253,003 | B1 | 2/2016 | Harel |
| 9,257,811 | B2 | 2/2016 | Gao |
| 9,258,052 | B2 | 2/2016 | George |
| 9,268,092 | B1 | 2/2016 | Jarecki, Jr. |
| 9,344,125 | B2 | 5/2016 | Kpodzo |
| 9,344,139 | B2 | 5/2016 | Sjoland |
| 9,385,268 | B2 | 7/2016 | Minamiru et al. |
| 9,391,667 | B2 | 7/2016 | Sundstrom |
| 9,438,288 | B2 | 9/2016 | Feld |
| 9,450,623 | B2 | 9/2016 | Weissman |
| 9,490,963 | B2 | 11/2016 | Choi |
| 9,520,985 | B2 | 12/2016 | Choi |
| 9,571,205 | B1 | 2/2017 | Suarez |
| 9,589,812 | B2 | 3/2017 | Takahashi et al. |
| 9,602,149 | B1 | 3/2017 | Tanzi |
| 9,608,718 | B2 | 3/2017 | Monsen |
| 9,651,652 | B2 | 5/2017 | Kpodzo et al. |
| 9,667,404 | B2 | 5/2017 | Sjoland |
| 9,696,492 | B1 | 7/2017 | Cox |
| 9,698,913 | B2 | 7/2017 | Foster |
| 9,703,056 | B2 | 7/2017 | Neelantan et al. |
| 9,712,233 | B1 | 7/2017 | Deng |
| 9,722,713 | B2 | 8/2017 | Tanzi |
| 9,723,612 | B2 | 8/2017 | Stapleton |
| 9,726,821 | B2 * | 8/2017 | Murray ............. G02B 6/14 |
| 9,748,906 | B2 | 8/2017 | Stewart |
| 9,768,852 | B2 | 9/2017 | Ling |
| 9,774,364 | B2 | 9/2017 | Shih |
| 9,775,123 | B2 | 9/2017 | Harel |
| 9,793,943 | B2 | 10/2017 | Sjoland |
| 9,793,992 | B2 | 10/2017 | Hino |
| 9,807,700 | B2 | 10/2017 | Harel |
| 9,847,258 | B2 | 12/2017 | Rohleder et al. |
| 9,871,552 | B2 | 1/2018 | Din |
| 9,885,806 | B2 | 2/2018 | Steinhardt |
| 9,885,825 | B2 | 2/2018 | Kopp |
| 9,900,044 | B2 | 2/2018 | Sjoland |
| 9,923,593 | B2 | 3/2018 | Andersson |
| 9,923,708 | B2 | 3/2018 | Khandani |
| 9,960,805 | B2 | 5/2018 | Wyville |
| 9,960,850 | B2 | 5/2018 | Daniel |
| 9,973,282 | B2 | 5/2018 | Welch |
| 9,997,363 | B2 | 6/2018 | Ono et al. |
| 10,009,120 | B2 | 6/2018 | Ranson |
| 10,027,465 | B2 | 7/2018 | Sjoland |
| 10,031,246 | B2 | 7/2018 | Zhou |
| 10,038,471 | B2 | 7/2018 | Chang |
| 10,084,506 | B2 | 9/2018 | Sjoland |
| 10,110,306 | B2 | 10/2018 | Jain et al. |
| 10,177,836 | B2 | 1/2019 | Hong |
| 10,187,158 | B2 | 1/2019 | Kikuchi |
| 10,191,217 | B2 * | 1/2019 | Boutami ............. G02B 6/305 |
| 10,257,746 | B2 | 4/2019 | Jain et al. |
| 10,321,357 | B1 | 6/2019 | Jain et al. |
| 10,325,861 | B2 | 6/2019 | Miccoli |
| 10,341,028 | B2 | 7/2019 | Kanter |
| 10,356,782 | B2 | 7/2019 | Negus |
| 10,367,584 | B2 | 7/2019 | Rakich |
| 10,418,775 | B2 | 9/2019 | Gao |
| 10,491,313 | B2 | 11/2019 | Jain |
| 10,656,350 | B2 | 5/2020 | Chen et al. |
| 10,663,663 | B2 * | 5/2020 | Painchaud ............ G02B 6/1228 |
| 10,673,519 | B2 | 6/2020 | Hong |
| 10,727,945 | B1 | 7/2020 | Nguyen et al. |
| 10,754,091 | B1 * | 8/2020 | Nagarajan ............ H04B 10/40 |
| 10,873,877 | B2 | 12/2020 | Jain et al. |

(56) References Cited

U.S. PATENT DOCUMENTS

| | | |
|---|---|---|
| 2003/0161637 A1 | 8/2003 | Yamamoto |
| 2004/0151238 A1 | 8/2004 | Masenten |
| 2004/0264610 A1 | 12/2004 | Marro |
| 2011/0065408 A1 | 3/2011 | Kenington |
| 2011/0065409 A1 | 3/2011 | Kenington |
| 2013/0295980 A1 | 11/2013 | Reuven |
| 2014/0169236 A1 | 6/2014 | Choi |
| 2016/0103341 A1 | 4/2016 | Long |
| 2017/0176780 A1 | 6/2017 | Levy et al. |
| 2018/0006795 A1 | 1/2018 | Raaf |
| 2018/0248627 A1 | 8/2018 | Daniel |
| 2019/0007140 A1 | 1/2019 | Vishwanath et al. |
| 2020/0209476 A1 | 7/2020 | Mattis et al. |
| 2020/0229031 A1 | 7/2020 | Jain et al. |
| 2021/0036779 A1 | 2/2021 | Nguyen et al. |

FOREIGN PATENT DOCUMENTS

| | | | |
|---|---|---|---|
| EP | 3561561 A1 * | 10/2019 | ........... G02B 6/1228 |
| GB | 2139374 | 11/1984 | |
| JP | 2002214461 | 7/2002 | |
| JP | 2006301415 | 11/2006 | |
| RU | 2474056 | 1/2013 | |
| WO | WO 06/072086 | 7/2006 | |
| WO | WO 07/092767 | 8/2007 | |
| WO | WO 08/036356 | 3/2008 | |
| WO | WO 12/112357 | 8/2012 | |
| WO | WO 16/118079 | 7/2016 | |

OTHER PUBLICATIONS

IBM, "Silicon Nanophotonic Packaging," https://researcher.watson.ibm.com/researcher/view_group_subpage.php?id=5522, Jul. 2016.

Li et al., "Multimode silicon photonics," Nanophotonics, vol. 8, No. 2, pp. 227-247, May 16, 2019.

Mothe et al., "Multichannel Microwave Photonics Signals Summation Device," IEEE *Photonics Technology Letters*, vol. 3, No. 3, pp. 140-142, Feb. 1, 2011.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniére et al., "Microwave Photonics Summation Device with up to 19 Input Signals in K and Ku Bands," *Journal of Lightwave Technology*, vol. 34, No. 20, pp. 4715-4721, Oct. 15, 2016.

Yoo et al., "Heterogeneous 2D/3D photonic integrated microsystems," *Microsystems & Nanoengineering*, 2, 16030, Aug. 2016.

\* cited by examiner

| $W_{Center}$ (μm) | $W_{Side}$ (μm) | $W_{Spacing}$ (μm) (Edge to edge) | TE PROPAGATION EFFICIENCY | TM PROPAGATION EFFICIENCY | INDEX OF TOP CLADDING | THICKNESS OF TOP CLADDING (μm) | TOTAL CONVERTER LENGTH (μm) | TE/TM COUPLING EFFICIENCY WITH FIBER (Z-SHIFT (μm)) |
|---|---|---|---|---|---|---|---|---|
| 0.18 | 0.18 | 2.50 | 0.7587 | 0.9415 | 1.4397 | 4.0 | 310 (FOR TE) | 0.887473 (-1.46391) 0.847934 (-1.00007) |
| 0.18 | 0.18 | 2.50 | 0.7742 | 0.9484 | 1.4397 | 7.0 | 310 (FOR TE) | 0.912696 (-1.26425) 0.875856 (-0.81707) |
| 0.18 | 0.18 | 2.50 | 0.9217 | 0.9941 | 1.445 | 7.0 | 350 (FOR TE) | 0.925503 (-0.00391) 0.858444 (-0.00523) |

FIG. 8

LOW LOSS, POLARIZATION-INDEPENDENT, LARGE BANDWIDTH MODE CONVERTER FOR EDGE COUPLING

BACKGROUND

Technical Field

This application relates generally to integrated optics and, in particular, to interfaces that facilitate edge coupling, e.g., chip-to-chip coupling, optical fiber-to-photonic chip coupling, and the like.

Brief Description of the Related Art

Many integrated photonic applications, such as radio-frequency signal processing and optical neural networks, require robust and low loss operation over polarization and wavelength. While integrated photonic components can be designed to meet these specifications, coupling light to and from a photonic integrated circuit (PIC) has been a difficult challenge. In particular, the difficulty lies in the large modal mismatch between an integrated waveguide and a standard single-mode (e.g., SMF-28) fiber, and this mismatch inhibits efficient optical input-output (IO) coupling.

Today, two main solutions exist to address this problem, namely, edge (also referred to as in-plane, butt or end-fire) coupling, and vertical (out-of-plane) coupling. A typical edge coupler (EC) has an inverse taper structure wherein the waveguide width gradually reduces along the direction of light propagation to a small value at an end tip. Edge coupling benefits from polarization independence and operation over large bandwidths, but the approach necessitates a large overlap between the fiber and waveguide optical modes. Further, a typical single inverted taper-based mode converter fails to simultaneously provide low coupling loss, polarization independence, and broad bandwidth operation. For instance, an inverted taper coupler for silicon-on-insulator ridge waveguide can achieve ~0.36 dB and ~0.66 dB coupling losses for TM and TE waveguide modes, respectively, but only over a working bandwidth of 80 nm. Vertical coupling, on the other hand, redirects the light out of the waveguide plane, typically through the use of diffractive gratings. Diffractive gratings, however, suffer from high polarization and wavelength sensitivity, leading to lower coupling efficiency.

There remains a need to provide for improved optical fiber-to-PIC interfaces.

BRIEF SUMMARY

A mode converter formed by three (3) parallel tapered waveguides on a SiN platform is configured for low loss, polarization-independent and broad bandwidth coupling of light to an optical fiber. The waveguides form a trident structure comprising a main, central waveguide with an inverse taper structure (i.e., wherein the waveguide width gradually reduces along the direction of light propagation to a small value at an end tip), and preferably an adjacent waveguide positioned on each respective side of the main, central waveguide. Each adjacent waveguide has a taper structure but one that is opposed to that of the main waveguide. In particular, each adjacent waveguide has a width that gradually increases along the direction of light propagation to a larger value at an end tip. The end tips of the three parallel waveguides terminate along a common input/output facet of the converter. The adjacent waveguides help to shape the mode of the light propagating through the main waveguide, in so doing enabling the converter to exhibit high coupling efficiency and polarization independence in the full optical communication bands (i.e., from O to L-band) by successfully tuning the mode shape at a chip facet. The trident mode converter enables efficient and robust fiber-to-chip coupling and is useful in many applications, e.g., optical neural networks, RF-photonic filters, and others.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 8 depicts a table of representative waveguide dimensions and upper cladding thickness and index values for representative embodiments of the trident mode converter.

DETAILED DESCRIPTION

The following description assumes familiarity for silicon (Si) photonics, which is the known study and application of photonic systems using silicon as the optical medium. The silicon typically is patterned into micro-photonic components (typically Si waveguides) that operate in the infrared band, most commonly at the 1.55 micrometer wavelength used in many fiber optic telecommunications system. Photonic integrated circuits are fabricated from a variety of material systems, including electro-optic crystals such as lithium niobate, silica on silicon, Silicon on insulator, silicon nitride (SiN) as well as various polymers and semiconductor materials. While silicon photonics provide many useful properties, the compatibility of this platform with optical fiber components is still limited. This is because of the large size mismatch between the optical fiber and the silicon photonic waveguide modal distribution. The trident mode converter of this disclosure addresses the problem of how to efficiently couple light to and from the silicon photonic components.

Figure 1A:
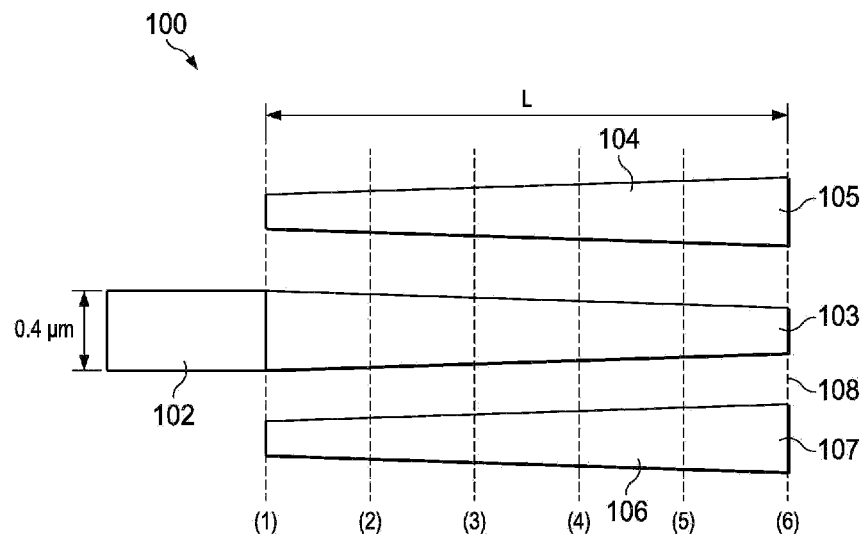
FIG. 1A depicts a top view of the mode converter of this disclosure.
Figure 1B:
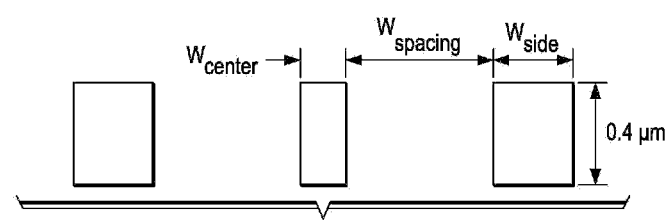
FIG. 1B depicts a side view of the parallel waveguides comprising the mode converter shown in FIG. 1A.

To this end, and with reference now to FIGS. 1A and FIG. 1B, a preferred configuration of the mode converter of this disclosure is provided. In a preferred, but non-limiting, configuration, the mode converter 100 is formed by three parallel tapered waveguides on a SiN platform. As will be described, the converter is configured for low loss, polarization-independent, and broad bandwidth coupling of light to an optical fiber. The waveguides form a trident structure and comprise a main, central waveguide 102 with an inverse taper structure (i.e., wherein the waveguide width gradually reduces along the direction of light propagation to a small value at an end tip 103), and a pair of adjacent waveguides 104 and 106 that help shape the mode of the light propagating through the main waveguide 102. As depicted in the top view in FIG. 1A, in this preferred embodiment the adjacent waveguides 104 and 106 are positioned on each respective side of the main, central waveguide 102. As also seen in FIG. 1A, each adjacent waveguide has a taper structure but one that is opposed to that of the main waveguide. In particular, adjacent waveguide 104 has a width that gradually increases along the direction of light propagation to a larger value at an end tip 105. Likewise, adjacent waveguide 106 has a width that gradually increases along the direction of light propagation to a larger value at the end tip 107. An overall length L is labeled in FIG. 1A. The end tips of the three parallel waveguides terminate along a common input/output facet 108 of the converter, which has a total width of $W_{center}+2\times(W_{side}+W_{spacing})$.

Figure 2A:
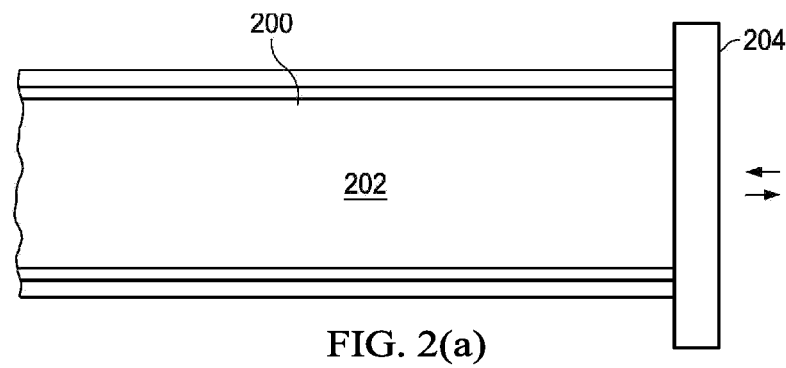
FIG. 2A depicts a top view of the mode converter positioned at an interface between a photonic chip and an optical fiber.
Figure 2B:
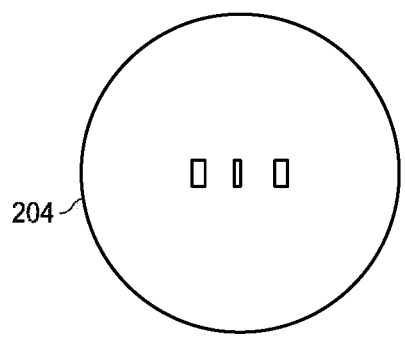
FIG. 2B depicts a side view of the mode converter of FIG. 2A.
Figure 2C:
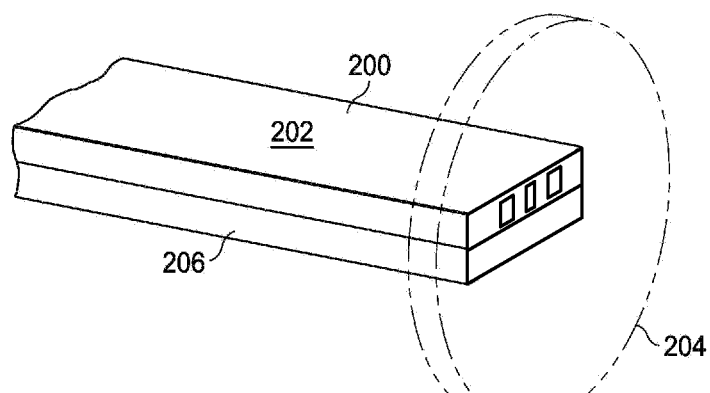
FIG. 2C depicts a perspective view of the mode converter-to-fiber interface of the mode converter depicted in FIG. 2A and FIG. 2B.

FIG. 2A depicts a top view of the mode converter 200 positioned at an interface between a photonic chip 202, and an optical fiber 204. As depicted, the mode converter is formed on the Si substrate 206. FIG. 2B depicts a side view of the mode converter of FIG. 2A, and FIG. 2C depicts a perspective view of the mode converter-to-fiber interface.

In this preferred embodiment, a maximal overlapping integral of mode area with the optical fiber is attained, preferably by tuning the geometry of the waveguides, thereby enabling a proper mode shape at the facet 108. The coupling efficiency of a mode converter is calculated (equation (1) below) from the overlap integral between an optical fiber mode and a mode at the converter tip near the chip facet:

$$\eta = \frac{\left[\int\int E_f(x,y)\cdot E_w^*(x,y)dxdy\right]^2}{[\int\int E_f(x,y)\cdot E_f^*(x,y)dxdy][\int\int E_w(x,y)\cdot E_w^*(x,y)dxdy]} \quad (1)$$

where $E_f(x,y)$ and $E_w(x,y)$ are the electric field profiles of the fiber and converter tip waveguide, respectively. Minimizing fiber-to-chip coupling loss involves engineering the waveguide mode shape to match the fiber mode.

Figure 1C:
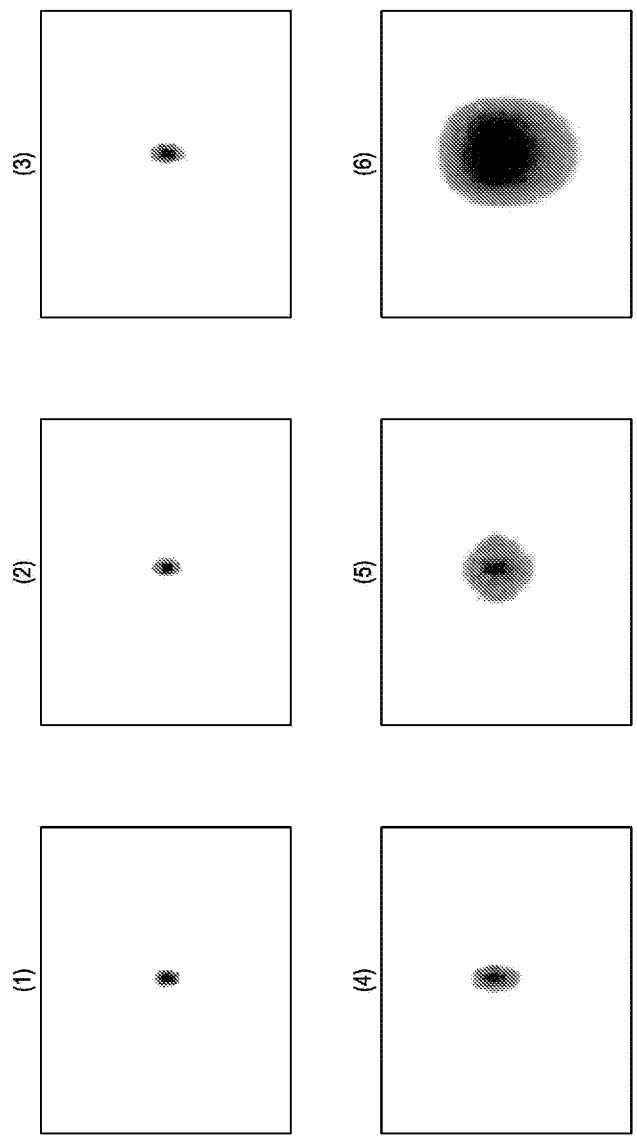
FIG. 1C depicts TE mode intensity profiles at various cross-sections labeled in FIG. 1A along the propagation direction, with the resulting mode size evolution depicted as closely matching with an optical fiber diameter.

For example, and with reference to FIG. 1B, given $W_{center}$ (a width of the center (main) waveguide 102), $W_{side}$ (a width of each side (adjacent) waveguide and $W_{spacing}$ (an edge-to-edge spacing between the center and a side waveguide), when $W_{center}$=0.18 μm, $W_{side}$=0.18 μm, and $W_{spacing}$=0.25 μm (which are merely exemplary), the mode converter 100 exhibits a coupling efficiency of ≥60% (~2.2 dB) across the entirety of the O- to L-bands (i.e., 1280~1635 nm). As noted above, the adjacent waveguides help to shape the mode of the light propagating through the main waveguide, in so doing enabling the converter to exhibit high coupling efficiency and polarization independence in the full optical communication bands (i.e., from O to L-band) by successfully tuning the mode shape at a chip facet. In particular, the adjacent waveguide(s) shape the mode by increasing the rotational symmetry of the single-mode as the light couples to the adjacent waveguide(s). The structure is an adiabatic coupler, as the structure adiabatically converts the mode of the single main waveguide. FIG. 1C depicts this mode shaping. In particular, FIG. 1C shows TE mode intensity profiles at various cross-sections labeled in FIG. 1A along the propagation direction, with the resulting mode size evolution depicted as closely matching with an optical fiber diameter.

Figure 3:
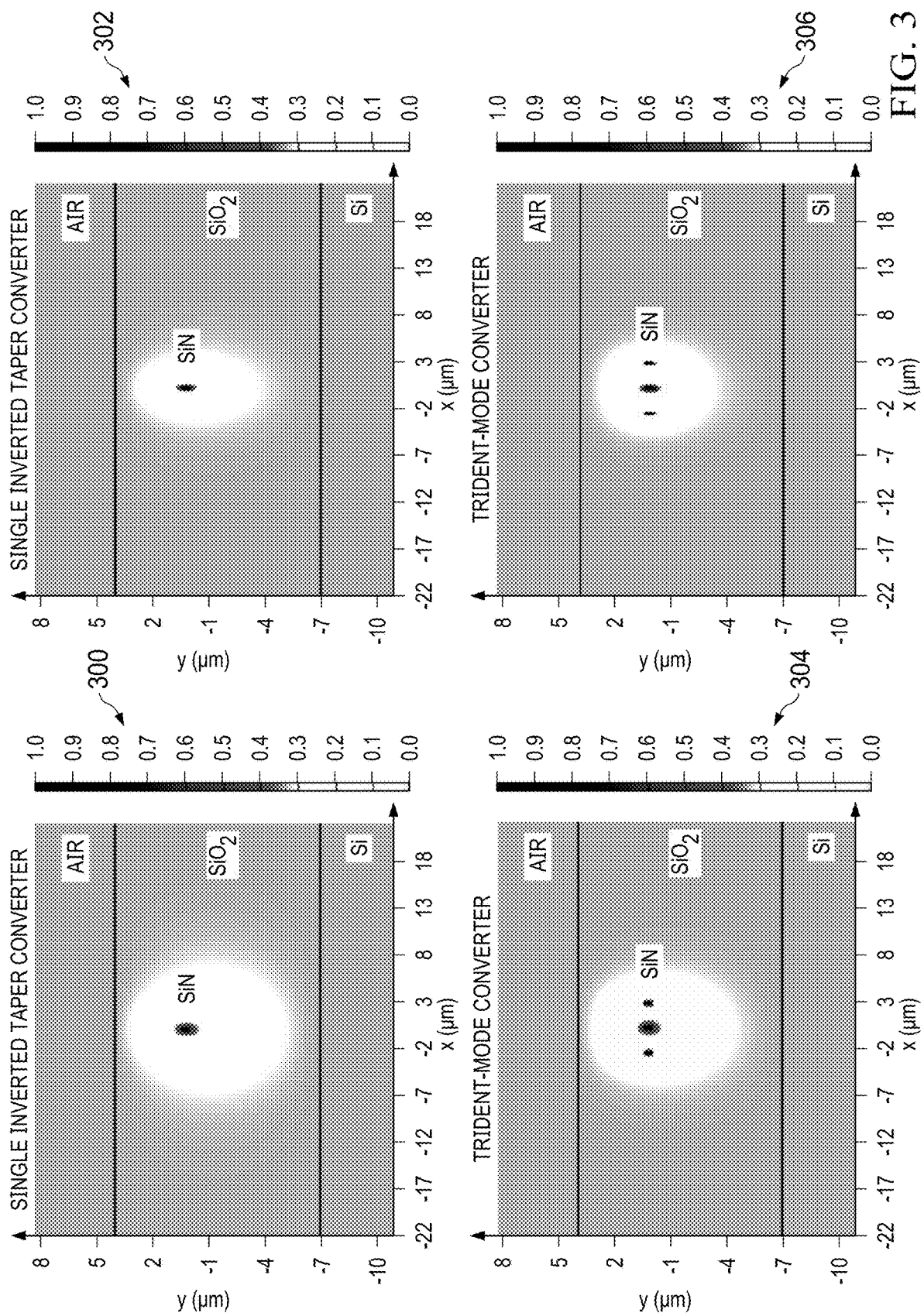
FIG. 3 depicts a comparison of mode intensity profiles for a conventional (single inverted taper-mode) converter versus the trident mode converter of this disclosure.

FIG. 3 depicts a qualitative visualization of TE and TM mode intensity profiles for a conventional (single inverted taper-mode) converter versus the trident mode converter. In particular, the top two (2) profiles 300 and 302 depicts the respective TE and TM mode intensity profiles for a typical single inverted taper mode converter at 1550 nm wavelength, and with a taper with of 0.18 μm, at the facet, whereas the bottom two profiles 304 and 306 depict the respective TE and TM mode intensity profiles for the trident mode converter, again at 1550 nm and using the geometry and spacing ($W_{center}$=0.18 μm, $W_{side}$=0.18 μm, and $W_{spacing}$=0.25 μm) described above. As depicted, the elliptical mode intensity profiles (300 and 302) at the facet of the single inverted taper mode converter for TE and TM modes and illustrate low coupling efficiency to a circular fiber mode. As expected, and comparing profiles 300 and 302, a more confined mode is observed for the TM polarization due to the higher dimensional waveguide geometry in the y direction (e.g., 0.18 μm×0.4 μm), indicating even worse coupling efficiency with fiber. This difference in TE and TM waveguide mode results in large polarization dependent loss (PDL). In contrast, and as represented by profiles 304 and 306, the profile shapes of the TE and TM modes observed for the trident mode converter are more circular and are larger in size. As will be further described, the coupling efficiency is improved up to ~20% (~10%) for TE (TM) mode, respectively.

Figure 4:
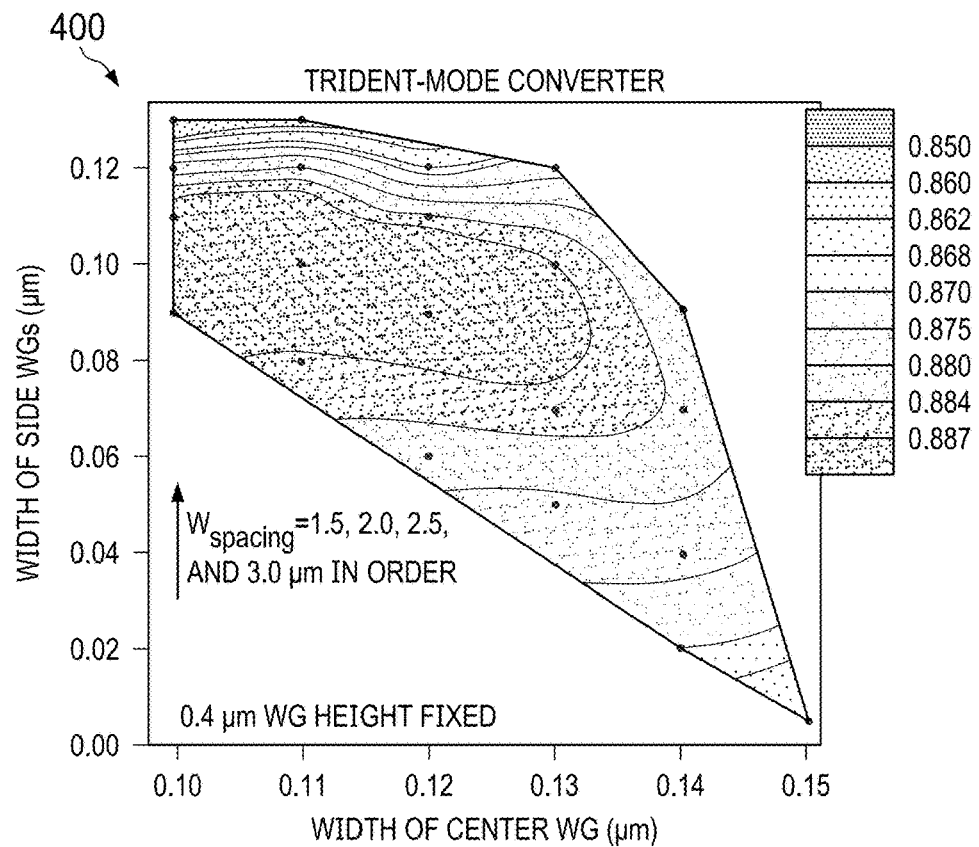
FIG. 4 depicts a pair of plots that show how the dimensions of the waveguides in the trident mode converter can vary and still provide appropriate coupling efficiencies as compared to the single inverted taper-mode converter.
Figure 4:
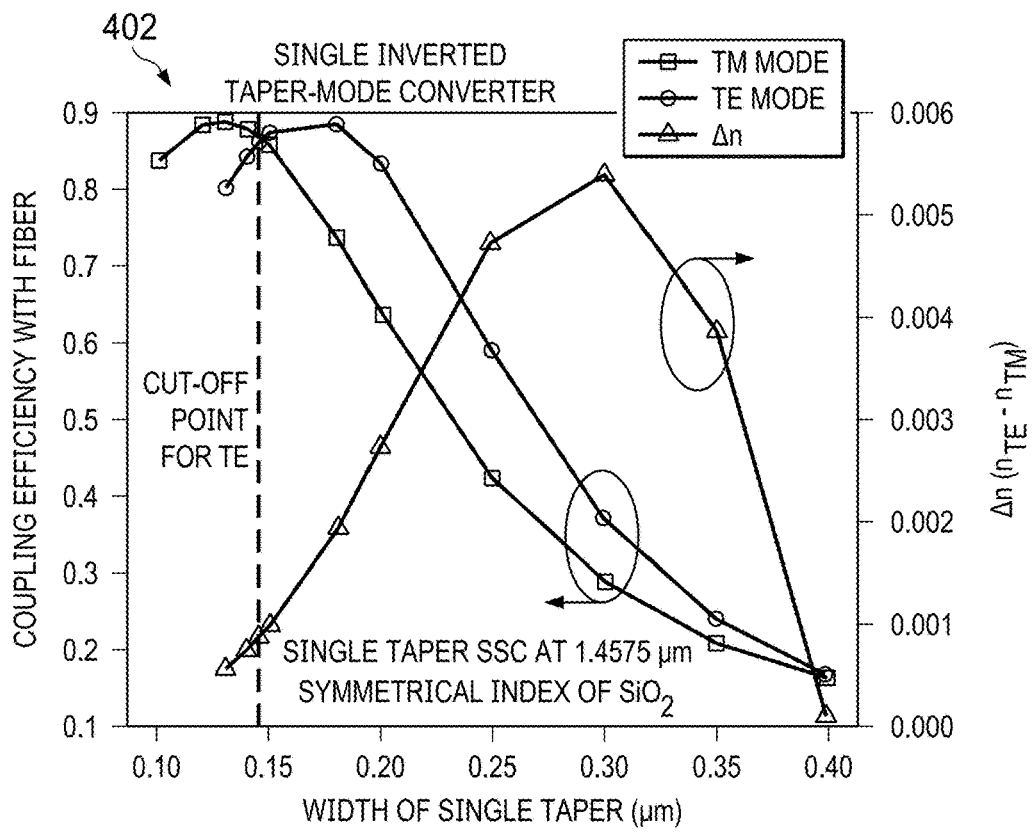

FIG. 4 depicts a contour plot 400 of the coupling efficiency with fiber dependency on various $W_{center}$, $W_{side}$, and $W_{spacing}$ parameter values. To create this plot, optimization of the three parameters were performed at a middle band wavelength of 1457.5 nm using a Finite Difference Eigenmode (FDE) solver. The black dots represent the equal coupling efficiencies with fiber for TE and TM modes, respectively. As depicted, a maximum coupling efficiency of ~89% (i.e., ~0.5 dB, grey color area) is attained for $W_{center}$ ($W_{side}$) in the range of 0.1~0.13 (0.08~0.11) μm, respectively. In the above-described example, it should be noted that the parameter values $W_{center}$=0.18 μm, $W_{side}$=0.18 μm, and $W_{spacing}$=0.25 μm were used merely to account for processing resolution capability. The efficiency of larger $W_{center}$ cases (≥0.15 μm) approaches that of a single taper spot-size converter (SSC), as shown in plot 402. As these plots reflect, and as compared to the SSC, the trident mode converter is less sensitive, and thus more tolerant on variation in the waveguide dimensions.

If not addressed, the difference in refractive index for the two orthogonal polarizations (i.e., birefringence) can induce polarization dependent behavior for an optical waveguide, such as the SSC. To reduce the modal birefringence, $\Delta n_{eff}=n_{eff\_TM}-n_{eff\_TE}$, there are two typical approaches used, namely, by changing either the properties of the material, or the geometry of the waveguides. The design of the trident mode converter leverages the second approach. In particular, and as has been described, in one embodiment the converter comprises a SiN polarization independent waveguide geometry having a cross section of 0.4 µm×0.4 µm, and the two side waveguides are positioned (formed) close to the center waveguide with appropriate $W_{center}$, $W_{side}$, and $W_{spacing}$ parameters. In this way the minimal modal birefringence of ~0.001 can be attained. Contour plot 400 depicts the result, namely, equal coupling efficiencies with fiber for the TE and TM modes (i.e., polarization independence).

Figure 5:
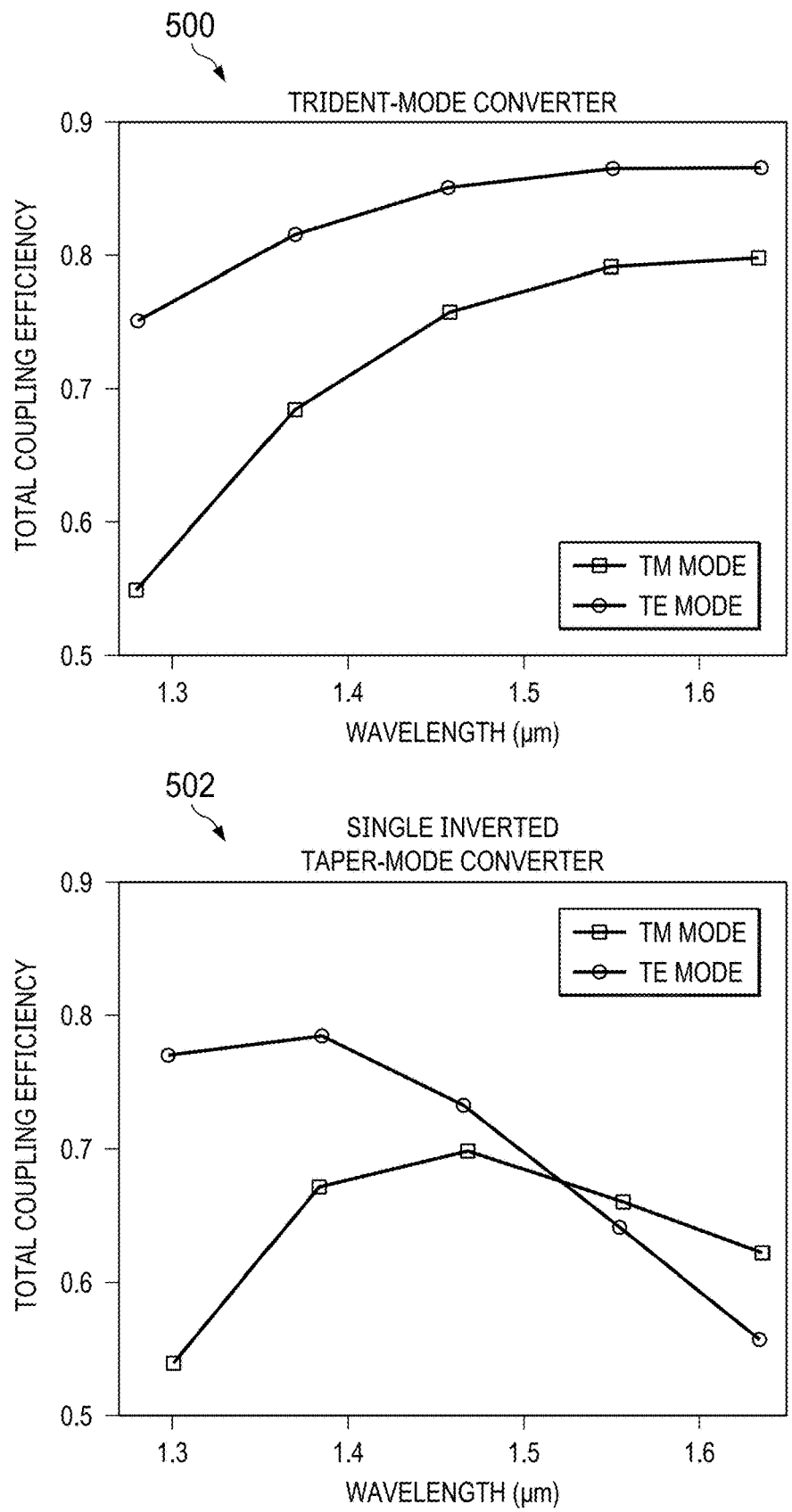
FIG. 5 depicts a comparison of total coupling efficiency for the trident mode converter of this disclosure versus the single inverted taper-mode converter.

FIG. 5 depicts a comparison of total coupling efficiency for the trident mode converter of this disclosure versus the single inverted taper-mode converter. Due to the more confined light in a shorter wavelength such as O-band, the overlapping integral of mode area with fiber is lower compared to the longer wavelength case, causing some non-uniform coupling efficiency. Nevertheless, by comparing plots 500 and 502, it can be seen that the overall performance of the trident mode converter outperforms the single inverted taper counterpart across the entire optical communication wavelength bands including O-, E-, S-, C- and L-bands.

As depicted in FIG. 5, at wavelengths at or about 1550 nm, the mode converter provides low loss coupling of less than 1 dB and low polarization dependent loss less than 0.3 dB.

As also depicted in FIG. 5, and with respect to a broader bandwidth (e.g., over a range of approximately 350 nm), the mode converter provides low loss TE coupling of less than 1.2 dB, TM coupling loss of less than 2.6 dB, and low polarization dependent loss less than 1.4 dB.

Figure 6:
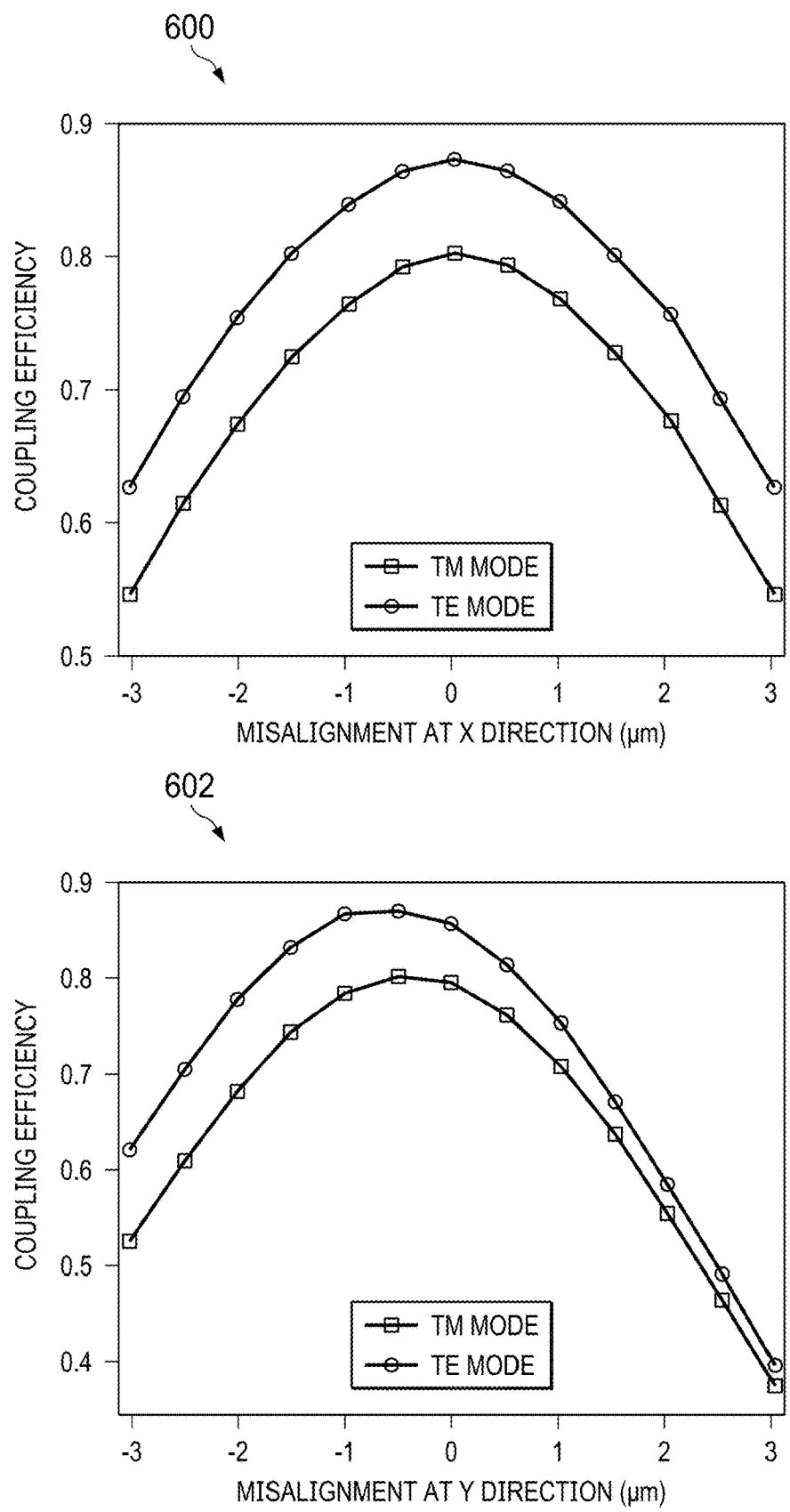
FIG. 6 depicts a comparison of coupling efficiencies of the trident mode converter when there is misalignment tolerance between the chip and fiber.

FIG. 6 depicts a comparison of coupling efficiencies of the trident mode converter when there is misalignment between the chip and fiber. A misalignment between the chip and a fiber can directly produce a reduction in coupling efficiency, especially for passively aligned assembly with pick-and-place tools. The conventional inverse tapers usually exhibit misalignment tolerances of less than ±1 µm. To evaluate this performance for the trident mode converter, in terms of maintaining greater than 80% (1.0 dB) of the peak coupling efficiency, ±2.5 (±2.3) µm with the misalignment in the x direction is obtained for TE (TM) mode (FIG. 6, plot 600), and −2.4~1.4 (−2.3~1.5) µm with the misalignment in the y direction is obtained for TE (TM) mode (FIG. 6, plot 602).

Figure 7:
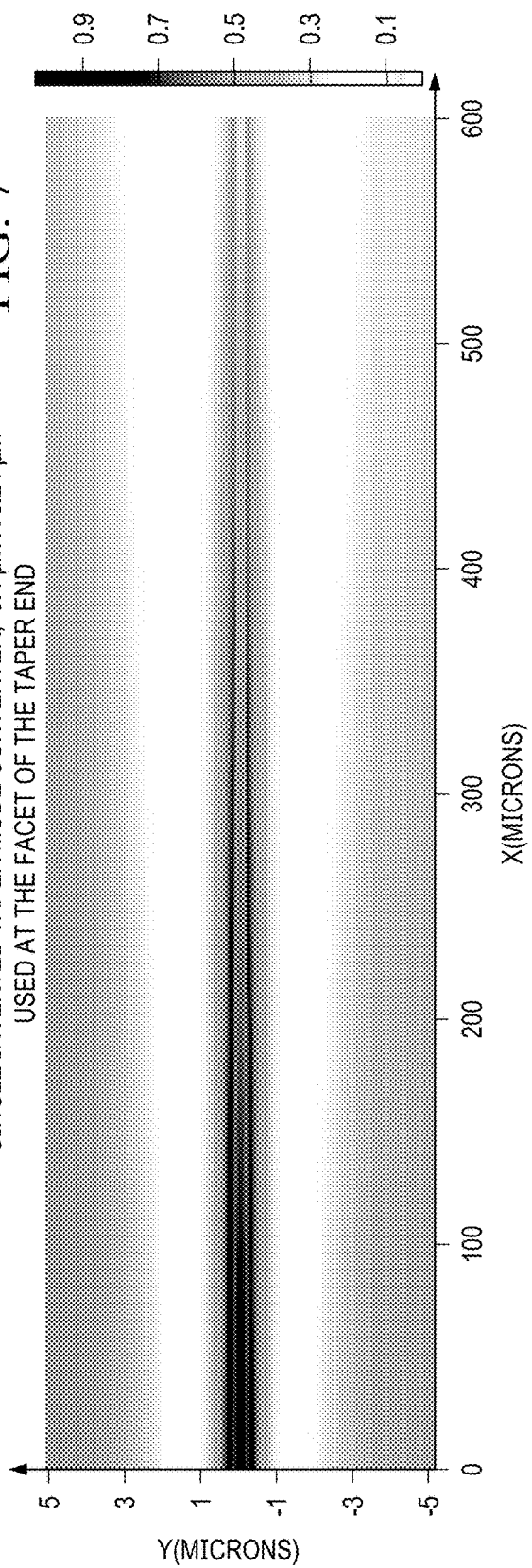
FIG. 7 depicts a comparison of mode field propagation along the trident mode converter of this disclosure versus the single inverted taper-mode convertor.
Figure 7:
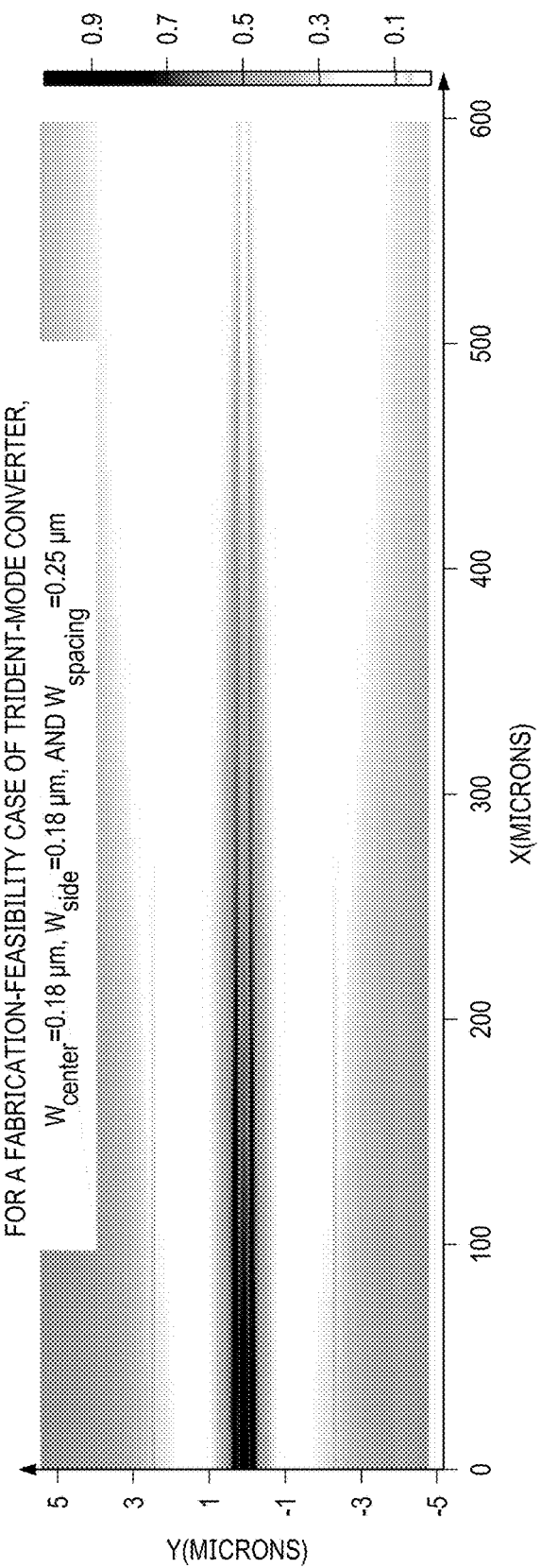

FIG. 7 depicts a comparison of mode field propagation along the trident mode converter of this disclosure versus the single inverted taper-mode convertor.

FIG. 8 depicts a table of representative thickness and index values of a top cladding layer for the trident mode converter on a SiN platform, wherein 7.0 µm thickness and 1.445 index values of a bottom cladding layer are assumed. As can be seen (in the third row), in this embodiment performance for the trident mode converter is maximized for a symmetrical configuration of cladding layers (i.e., the top and bottom claddings have the same thickness and index values).

While the trident configuration described is preferred, it is not intending to be limiting. The mode shaping provided by the adjacent waveguides may instead be carried out using just a single adjacent waveguide, and that single adjacent waveguide may also be configured above or below the main waveguide. Further, the converter may be configured to use three or more adjacent waveguides, e.g., waveguides situated to the left, right, above and/or below the main waveguide, or any combination (of the adjacent waveguides). In addition, although the above-described and illustrative embodiment (e.g., converter 100, in FIG. 1) comprises waveguides with linear tapers, this is not a requirement. A particular waveguide may include a non-linear taper, or an adjacent waveguide may be a straight waveguide with no taper. Generalizing, it is not required that the individual adjacent waveguides (e.g., 104 and 106, in FIG. 1) in the converter have the same physical structure (namely, width, length, taper, etc.). Further, although the mode converter in FIG. 1 has been depicted as being two (2)-dimensional, this is not a limitation either, as three (3)-dimensional (3D) structures may also be utilized (as referenced above). Thus, in general there is no requirement that the waveguides comprising the mode converter be fabricated in the same plane of the chip, and the one or more adjacent waveguides in such a 3D structure may have different sizes, shapes, and orientation relative to one another, and to the main waveguide.

As the above-described plots illustrate, the mode converter of this disclosure simultaneously provides low coupling loss, polarization independence, and broad bandwidth operation. The particular application(s) for the mode converter are varied and include, without limitation, optical neural networks, RF-photonic filters, and others.

The particular nature of the edge coupling provided by the mode converter may vary. In the typical use case, as has been described and depicted, the mode converter couples a photonic chip to an optical fiber. Other use cases include, without limitation, passive chip-to-passive chip coupling, passive chip-to-active chip coupling, and the like.

Having described the subject matter, what we claim is as follows:

1. A silicon photonic-to-optical fiber mode converter, comprising:
   a supporting silicon structure;
   a trident waveguide structure formed onto the supporting silicon structure and having a length and a width and comprising:
     a main waveguide having an inverse taper structure wherein a width $W_{center}$ of the waveguide gradually reduces along a direction of light propagation to a small value at an end tip thereof; and
     a pair of adjacent waveguides positioned on opposed sides of the main waveguide, each adjacent waveguide having a width $W_{side}$ that gradually increases along the direction of light propagation to a larger value at an end tip thereof; wherein:
   the main waveguide and the pair of adjacent waveguides terminating along a common facet interfacing, and aligned with, a central region of an end facet of an optical fiber having a diameter greater than the width of the trident waveguide structure; and
   the pair of adjacent waveguides configured and positioned to shape a mode of the light propagating through the main waveguide along the direction of the light propagation.

2. The mode converter of claim 1, wherein the main waveguide is a silicon nitride (SiN) polarization independent waveguide.

3. The mode converter of claim 1, providing low loss coupling of less than 1 dB and low polarization dependent loss less than 0.3 dB at wavelengths at or above 1550 nm.

4. The mode converter in of claim 1, providing one of:
coupling loss of less than 1.2 dB; and
TM coupling loss of less than 2.6 dB; and
polarization-dependent loss less than 1.4 dB over a bandwidth range over approximately 350 nm.

5. The mode converter of claim 1, wherein $W_{center}$ is in the range of 0.1~0.13 µm and $W_{side}$ is in the range of 0.08-0.11 µm.

6. The mode converter of claim 1, wherein the inverse taper structure of the main waveguide is linear or non-linear.

7. The mode converter of claim 1, wherein an adjacent waveguide has a taper that is one of:
linear; and
non-linear.

8. An optical light mode converter, comprising:
a supporting silicon structure; and
a waveguide structure formed on the supporting silicon structure and comprising:
a main waveguide having an inverse taper structure wherein a width $W_{center}$ of the main waveguide reduces along a direction of light propagation through the main waveguide; and
at least one adjacent waveguide separated from the main waveguide by a width $W_{spacing}$ and having a width $W_{side}$ that increases along the direction of light propagation through the main waveguide; wherein
the main waveguide and the at least one adjacent waveguide terminate along a common facet of the waveguide structure, the common facet interfacing, and aligned with, with an edge facet of an optical fiber external to the supporting silicon structure and having a diameter greater than a width of the waveguide structure; and
the at least one adjacent waveguide configured to adiabatically shape a mode of the light propagating through the main waveguide along the direction of the light propagation in a low-loss, polarization-independent, and broad band manner irrespective of a given misalignment tolerance between the waveguide and the edge structure external to the supporting silicon structure.

9. The optical light mode converter of claim 8, further including at least other adjacent waveguide, wherein the main waveguide and the adjacent waveguides comprise a trident structure.

10. The optical light mode converter of claim 8, wherein the main waveguide is a silicon nitride (SiN) polarization independent waveguide.

11. The optical light mode converter of claim 8, providing coupling loss of less than 1 dB and polarization dependent loss of less than 0.3 dB at wavelengths at or above 1550 nm.

12. The optical light converter of claim 8, providing one of:
TE coupling loss of less than 1.2 dB;
TM coupling loss of less than 2.6 dB; and
polarization-dependent loss less than 1.4 dB over a bandwidth range over approximately 350 nm.

13. The optical light mode converter of claim 8, wherein $W_{center}$ is in the range of 0.1 to 0.13 µm and $W_{side}$ is in the range of 0.08 to 0.11 µm.

14. The optical light mode converter of claim 8, wherein the inverse taper structure of the main waveguide is linear or non-linear.

15. The optical light mode converter of claim 8, wherein the adjacent waveguide has a taper that is one of linear or non-linear.

16. A mode converter, comprising:
a supporting silicon structure;
a main waveguide formed on the supporting silicon structure having an inverse taper structure wherein a width of the waveguide reduces along a direction of light propagation; and
first and second adjacent waveguides formed on opposite sides of the main waveguide and each having a width that that increases along the direction of light propagation; wherein:
the main waveguide and the first and second adjacent waveguides terminating along a common facet that interfaces an optical fiber having a diameter greater than a combined width of the main waveguide and the first and second adjacent waveguides; and
the adjacent waveguides configured to adiabatically shape a mode of the light propagating through the main waveguide along the direction of the light propagation.

* * * * *